United States Patent
Bhakta et al.

(10) Patent No.: US 7,899,470 B2
(45) Date of Patent: *Mar. 1, 2011

(54) TRANSMITTING AN ASSIGNMENT THROUGH WIRELESS TRANSMISSION

(75) Inventors: Dharmesh N. Bhakta, Austin, TX (US); Marc-Arthur Pierre-Louis, Round Rock, TX (US); Radhakrishnan Sethuraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/031,330

(22) Filed: Feb. 14, 2008

(65) Prior Publication Data
US 2008/0139185 A1    Jun. 12, 2008

Related U.S. Application Data

(63) Continuation of application No. 10/955,120, filed on Sep. 30, 2004, now Pat. No. 7,359,717.

(51) Int. Cl.
*H04W 24/00*    (2009.01)
*H04M 3/42*    (2006.01)
(52) U.S. Cl. .............. 455/456.4; 455/456.1; 455/414.2; 455/422.1
(58) Field of Classification Search .............. 455/456.3, 455/414.1, 456.4, 456.5, 456.6, 414.2, 457, 455/435.1, 435.2, 1, 41.2, 422.1; 340/10.1, 340/10.42, 3.1, 5.1, 540
See application file for complete search history.

(56) References Cited

U.S. PATENT DOCUMENTS 4,752,876 A    6/1988    Couch et al.

(Continued)

FOREIGN PATENT DOCUMENTS

EP    0876070 A1    11/1998

(Continued)

OTHER PUBLICATIONS

Tom Farley, "Cellular Telephone Basics: AMPS and Beyond", Privateline.com: Cellular Telephone Basics, http://www.privateline.com/Cellbasics/Cellbasics.html, printed Sep. 22, 2004, pp. 1-8.

(Continued)

*Primary Examiner*—Sonny Trinh
(74) *Attorney, Agent, or Firm*—Francis Lammes; Stephen J. Walder, Jr.; Diana R. Gerhardt

(57) ABSTRACT

A customer automatically receiving an assignment on his wireless device without the need to visit a reservation desk is provided. When the customer initially makes a reservation with a vendor, a computer records the wireless device's identification. When the customer arrives at or near the vendor's location, the system creates an out-of-range condition for the wireless device by shielding a portion of a location that the customer will be passing through. In response, the wireless device re-scans the control channels in an attempt to establish better communications with a wireless communication tower. A transceiver positioned in the transition zone transmits a channel that is detected and locked-on by the wireless device. The wireless device transmits its identification to the transceiver, which in turn forwards it to the computer. The computer sends assignment information to the wireless device.

9 Claims, 8 Drawing Sheets

U.S. PATENT DOCUMENTS

| | | | |
|---|---|---|---|
| 5,442,805 | A | 8/1995 | Sagers et al. |
| 5,614,703 | A | 3/1997 | Martin et al. |
| 5,914,671 | A | 6/1999 | Tuttle |
| 5,979,754 | A | 11/1999 | Martin et al. |
| 6,049,700 | A | 4/2000 | Hardouin |
| 6,101,477 | A | 8/2000 | Hohle et al. |
| 6,127,917 | A | 10/2000 | Tuttle |
| 6,198,938 | B1 | 3/2001 | Chavez, Jr. |
| 6,389,288 | B1 | 5/2002 | Kuwahara et al. |
| 6,408,187 | B1 * | 6/2002 | Merriam ............ 455/458 |
| 6,509,829 | B1 | 1/2003 | Tuttle |
| 6,581,151 | B2 | 6/2003 | Henry et al. |
| 6,581,161 | B1 | 6/2003 | Byford |
| 6,603,397 | B2 * | 8/2003 | Bronson ............ 340/540 |
| 6,650,894 | B1 * | 11/2003 | Berstis et al. ........ 455/420 |
| 6,687,506 | B1 | 2/2004 | Girod |
| 6,823,199 | B2 | 11/2004 | Gough |
| 6,907,254 | B1 | 6/2005 | Westfield |
| 7,030,732 | B2 | 4/2006 | Tuttle |
| 7,142,877 | B2 | 11/2006 | Lipovski |
| 7,231,219 | B2 | 6/2007 | Curtis et al. |
| 7,275,689 | B2 | 10/2007 | Mak |
| 7,689,199 | B2 * | 3/2010 | Gough ............ 455/404.1 |
| 2001/0049275 | A1 | 12/2001 | Pierry et al. |
| 2002/0049535 | A1 | 4/2002 | Rigo et al. |
| 2003/0050806 | A1 | 3/2003 | Friesen et al. |
| 2003/0122685 | A1 | 7/2003 | Tuttle |
| 2003/0208386 | A1 | 11/2003 | Brondrup |
| 2005/0051622 | A1 | 3/2005 | Mak |

FOREIGN PATENT DOCUMENTS

| | | |
|---|---|---|
| JP | 11041644 | 2/1999 |
| JP | 2000253456 | 9/2000 |
| JP | 2001339761 | 12/2001 |
| WO | WO 01/20945 A1 | 3/2001 |

OTHER PUBLICATIONS

"Privateline.com: Digital Wireless Basics", http://www.privateline.com/PCS/HowPCSworks.htm, printed Sep. 22, 2004, pp. 1-6.

"Privateline.com: Cellular Telephone Basics", http://www.privateline.com/Cellbasics/Cellbasics02.html, printed Sep. 22, 2004, pp. 1-7.

"Privateline.com: Cellular Telephone Basics", http://www.privateline.com/Cellbasics/Cellbasics03.html, printed Sep. 22, 2004, pp. 1-5.

"Privateline.com: Cellular Telephone Basics", http://www.privateline.com/Cellbasics/Cellbasics04.html, printed Sep. 22, 2004, pp. 1-4.

"Privateline.com: Cellular Telephone Basics", http://www.privateline.com/Cellbasics/Cellbasics05.html, printed Sep. 22, 2004, pp. 1-7.

"Privateline.com: Cellular Telephone Basics", http://www.privateline.com/Cellbasics/Cellbasics06.html, printed Sep. 22, 2004, pp. 1-7.

"Privateline.com: Cellular Telephone Basics", http://www.privateline.com/Cellbasics/Cellbasics11.html, printed Sep. 22, 2004, 3 pages.

* cited by examiner

TRANSMITTING AN ASSIGNMENT THROUGH WIRELESS TRANSMISSION

This application is a continuation of application Ser. No. 10/955,120, filed Sep. 30, 2004, now U.S. Pat. No. 7,359,717.

CROSS-REFERENCE TO RELATED APPLICATION

Co-pending patent application "METHOD, APPARATUS, AND PROGRAM FOR AUTOMATED PROPERTY ADJUSTMENT IN A CELLULAR NETWORK" (Ser. No. 10/322,057, filed Dec. 17, 2002), having the same assignee as the present application, is hereby incorporated by reference.

BACKGROUND OF THE INVENTION

1. Technical Field

The present invention relates to wireless devices in a calling network and, more particularly, to a method and apparatus for transmitting assignments using wireless devices.

2. Description of the Related Art

Receiving an assignment for a hotel room, rental car, concert seat, airline seat, and so forth can be a difficult if not tedious process. Conventionally, vendors such as hotels, rental car agencies, and some airlines do not make firm assignments until the customer actually arrives because supply and demand for the object (e.g., hotel room, rental car, seat, table, etc) on any particular day can fluctuate. Therefore, a reservation generally guarantees an assignment, but does not guarantee an exact assignment until the customer actually arrives. Often customers must wait in long lines at reservation desks or ticket booths to receive their assignments, even though they already made a reservation. Accordingly, it would be advantageous to provide an assignment system and method whereby a customer would receive a firm assignment upon arrival, but would not have to endure waiting at a reservation desk or ticket booth. This system would advantageously reduce or eliminate the number of personnel manning such desks and booths.

SUMMARY

Accordingly, a preferred embodiment provides a method, system, and program product whereby a customer automatically receives an assignment on his wireless device upon arrival without the need to visit a reservation desk or ticket booth. When the customer initially makes a reservation with a vendor, a vendor computer records the reservation details and the customer's wireless device identification (e.g. phone number). On the day of the reservation, when the customer arrives at or near the vendor's location, the customer will pass through a transition zone that creates an out-of-range condition on the wireless device. The transition zone is a shielded portion of a location, such as an entryway or exit of a building, parking lot, airport, elevator, etc. The shielding reduces the signal strength between an activated (i.e., turned on) wireless device and its respective wireless communication tower. Alternatively, the transition zone may include a short-range signal jammer, or a combination of shielding and a short-range signal jammer. When the customer's activated wireless device enters the transition zone, it re-scans the forward control channels in an attempt to establish better communications with another wireless communication tower. In the mean time, a transceiver positioned in the transition zone transmits a channel that is detected and locked-on by the wireless device. In response, the wireless device transmits identity information to the transceiver, which in turn forwards it to the vendor computer (and, optionally, to a mobile telephone switching office). Using the identity information, the vendor computer first verifies the reservation, makes an assignment, and then sends the assignment to the wireless device as a text or audio message. Once the wireless device leaves the transition zone, it will re-establish communications with the communication tower and be ready to receive the message. The assignment information assigns a specific object to the customer.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
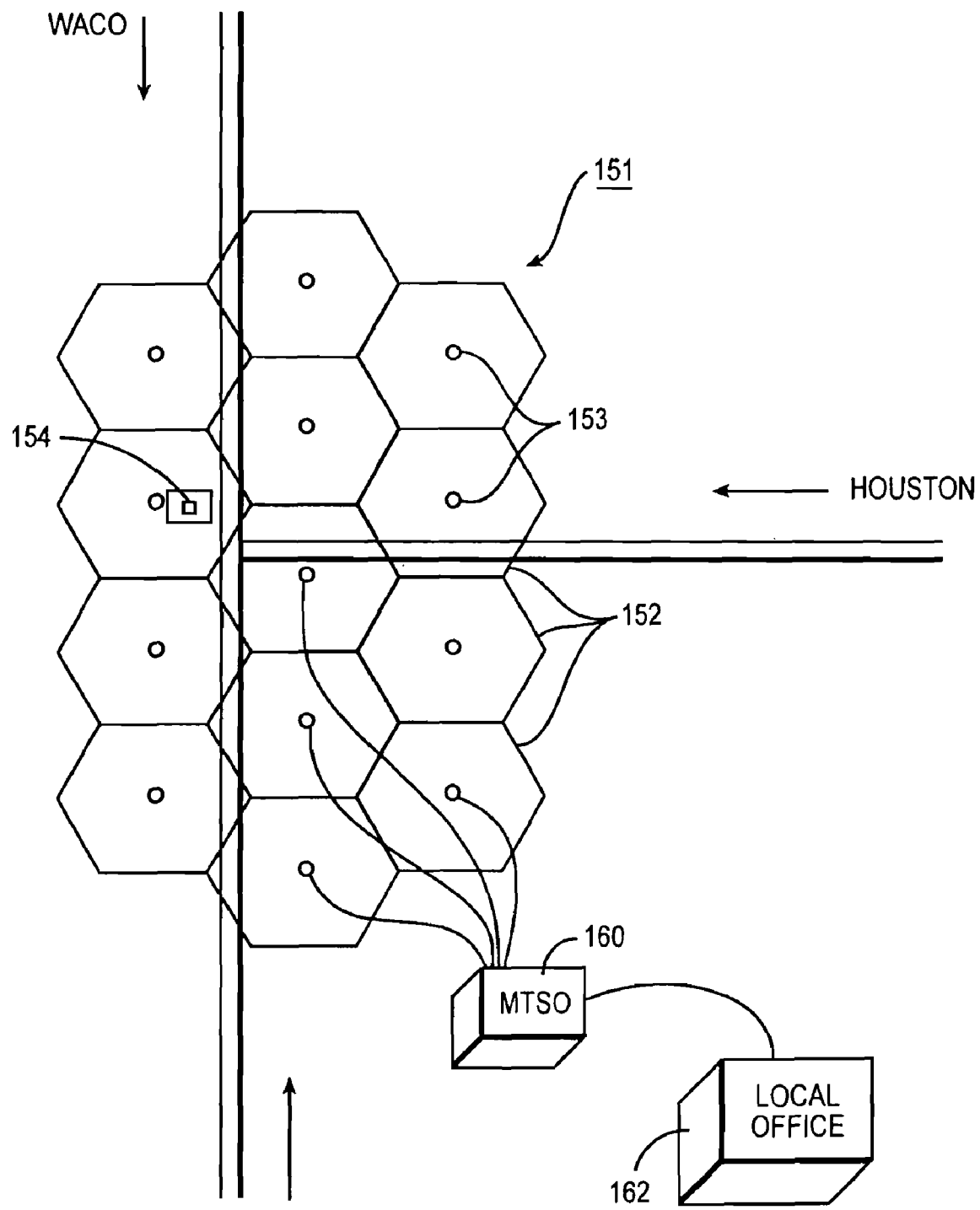
FIG. 1 is an illustrative wireless cellular telecommunications network.

FIG. 1 is intended to provide some background information on conventional cellular technology because the preferred embodiment is preferably practiced within a cellular telecommunication network. Illustrative cellular telecommunication layout 151 shows multiple cells 152 and base stations 153 that a mobile telephone customer may encounter while traveling to his destination, hotel 154. As shown, an area is broken up into multiple cells 152. Each cell typically ranges in diameter from 2 to 10 miles, and has a base station 153 that includes one or more antenna towers and a radio transceiver (not shown). Because mobile telephones and base stations use low-power transmitters, the same frequencies can be reused in non-adjacent cells. Each carrier in each city or region also operates one central office called the Mobile Telephone Switching Office (MTSO) 160. This office handles all of the phone connections to the normal land-based phone system (local office 162) and controls all of the base stations in the region. For example, MTSO 160 gathers traffic from dozens of cells 152 and passes it on to local office 162. MTSO 160 also places calls from land based telephones to wireless customers, switches calls between cells 152 as mobiles travel across cell boundaries, and authenticates wireless customers before they make calls. For more information on conventional cellular layout and technology, see *Cellular Telephone*

*Basics: AMPS and Beyond*, by Tom Farley with Mark van der Hoek, which is incorporated by reference herein.

Mobile phones and base stations 153 transmit or communicate with each other on dedicated paired frequencies called channels, which are typically in the 800 MHz range and assigned by MTSO 160. Each call uses two channels, one for voice and one for control. There are four frequency paths: "forward control path" means base station to mobile for control, "reverse control path" means mobile to base station for control, "forward voice path" means base station to mobile for voice, and "reverse voice path" means mobile to base station for voice. Base stations 153 constantly transmit identifying information or overhead on its respective forward control path. When a user initially turns on his mobile phone, the phone attempts to register with one of the base stations 153 by scanning through detected forward control paths until it finds one having the strongest signal. If the mobile phone does not detect a control channel, it determines that it is out of range and displays a "no service" message. If it detects one or more control channels, the mobile phone re-scans and camps on to the strongest one, and generally re-scans every seven seconds when idle or when signal strength drops below a pre-determined level. Once camped on, the mobile phone listens for a System Identification Code (SID) on the forward control path and compares it to the SID programmed into the phone. A SID is a unique 5-digit number that is assigned to each carrier by the FCC. If the SIDs match, the mobile phone determines that the base station that it is in communication with is part of its home system. However, if the SIDS do not match, then the mobile phone is roaming. Next, the mobile phone identifies itself on the reverse control path by sending its phone number, electronic serial number, and SID to the base station 153. The electronic serial number may be a 32 bit code that is unique to each mobile device and not alterable by either the end user or the cellular operator. The local base station 153 relays this information to MTSO 160 for verification and monitoring incoming calls. However, if the mobile phone is roaming, the MTSO of the cell that the customer is roaming in contacts the MTSO of the customer's home system, which then checks its database to confirm that the SID of the phone being used is valid. The home system verifies the customer's mobile phone to the local MTSO, which then tracks the mobile phone as it moves through its cells.

As described above, MTSO 160 tracks the mobile phone's location in a database (not shown) so that it knows which cell the customer is in when it needs to ring the mobile phone. If MTSO 160 receives a call for the customer, it tries to find the customer by looking in its database to see which cell the customer is in. MTSO 160 selects a frequency pair that the customer's phone will use in that cell to take the call. MTSO 160 then communicates with the mobile phone over the forward control channel to tell it which frequencies to use, and once the customer's mobile phone and tower 153 switch on those frequencies, the call is connected. As the customer moves toward the edge of a cell, the cell's base station 153 notes that the customer's signal strength is diminishing. Meanwhile, base station 153 in the cell the customer is moving toward (which is listening and measuring signal strength on all frequencies, not just its own) sees the customer's mobile phone's signal strength increasing. The two base stations 153 coordinate with each other through MTSO 160 and, at some point, the mobile phone receives a signal on a control channel telling it to change frequencies. This hand off switches the customer's mobile phone to the new cell.

Figure 2:
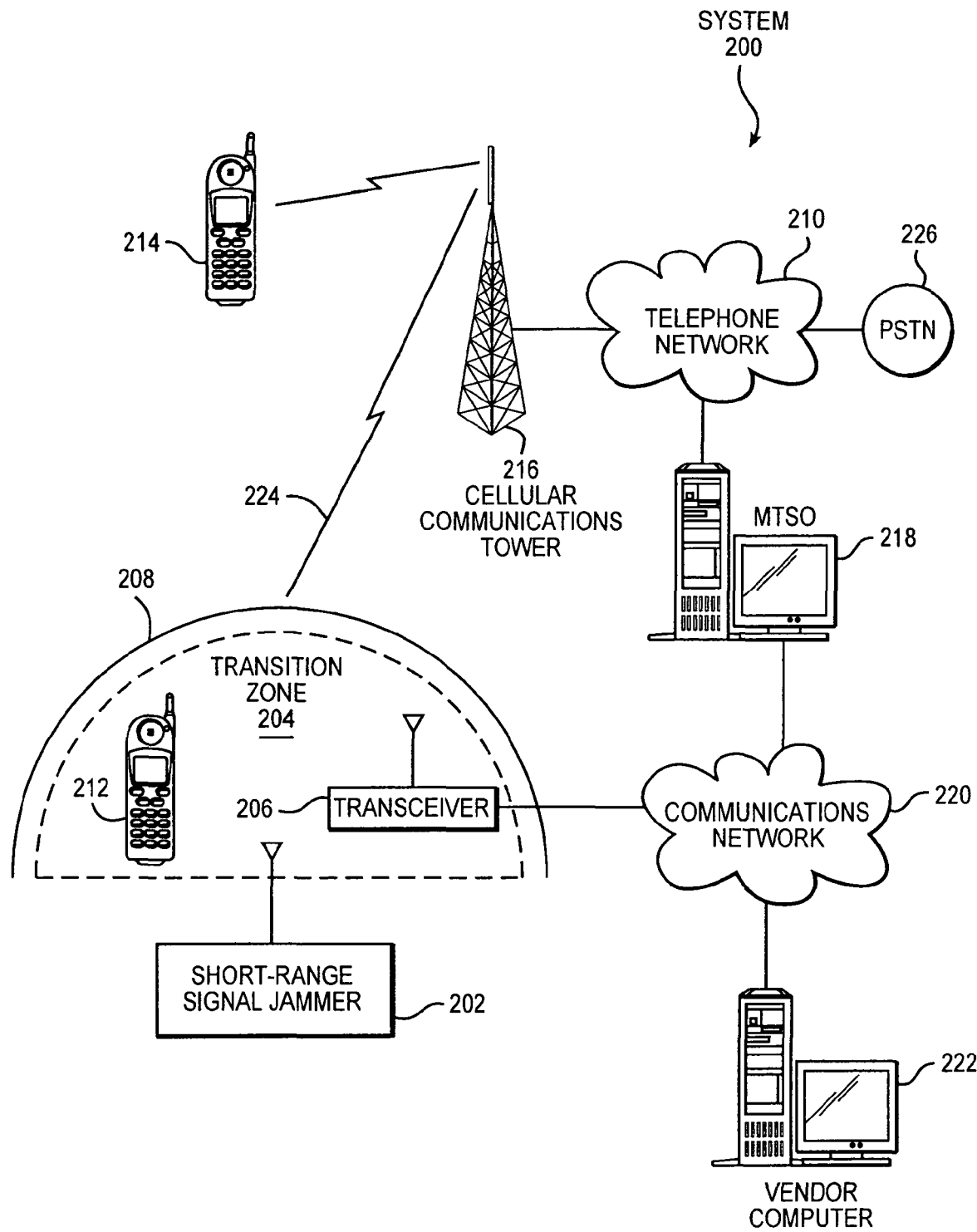
FIG. 2 is a pictorial representation of an assignment system in a wireless cellular telecommunications network.

FIG. 2 depicts a pictorial representation of assignment system 200 in a wireless cellular telecommunications network of devices in which the illustrative embodiment may be practiced. However, one skilled in the art will readily recognize that other wireless configurations may be implemented without departing from the scope and spirit of the invention. System 200 includes telephone network 210 and communications network 220 for providing communication links between various devices and computers connected in system 200. Both may include various connection types such as, for example, wire, wireless communication links or fiber optic cable. System 200 further includes: one or more wireless telephonic devices 212 or 214 (also referred to as "mobiles", "mobile phones", and "wireless devices"), each having a basic display and user input (e.g., standard telephone buttons); at least one cellular base station communications tower 216 (a "base station" includes a tower and a transceiver located at the center of a cell whose primary purpose is to handle all incoming and outgoing calls within the cell); at least one mobile telephone switching office (MTSO) 218, where MTSOs communicate with base station communication tower 216 (used interchangeably with tower 216) in a city or region for a particular carrier and further control connections to a conventional land-based public switched telephone network (PSTN) 226 via telephone network 210; at least one conventional vendor computer 222 having a processor, memory, and database storage (see FIG. 8); and transition zone 204 having outer shielding 208 and a conventional transceiver 206. A short-range signal jammer 202 may optionally be used. In the depicted example, telephone network 210 connects MTSO 218 with tower 216, which in turn communicates with various wireless communication devices, such as mobile phones 212 and 214.

Additionally, system 200 may include other servers, clients, and devices not shown. For example, customer computers may directly communicate with vendor computer 222. In the depicted example, system 200 may be implemented within the Internet with communications network 220 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, system 200 may also be implemented using a number of different types of networks, such as for example, an intranet, a local area network, or a wide area network. FIG. 2 is intended as an example, and not as an architectural limitation for the present invention.

Figure 8:
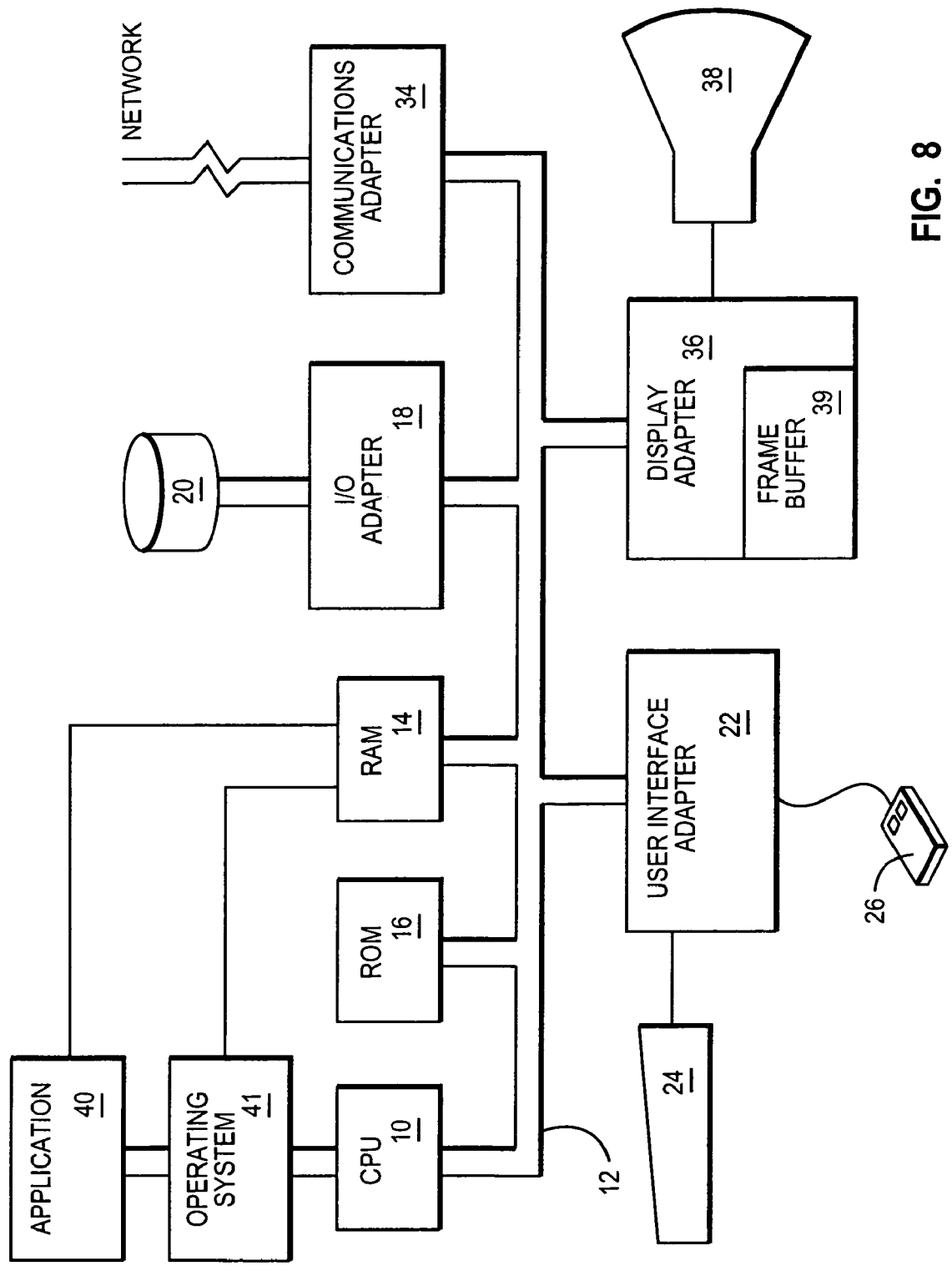
FIG. 8 is a block diagram depicting a computer system in which the present method and system may be implemented.

When a customer initially makes a reservation using, for example, a wireless device 214, or on-line through his computer (not shown) to vendor computer 222, vendor computer 222 receives and records customer information in its database storage (shown in FIG. 8). Customer information may include, for example, the customer's arrival date, details of the future reservation (e.g., king or queen size bed; economy size car), customer name, and the wireless device's identification (e.g., telephone number) on which the customer would like to receive the assignment (in this example, wireless device 212). Later, on the arrival date, when the customer arrives at or near the vendor's location to accept his reservation, the customer (and his activated wireless device 212) pass through transition zone 204, which may be located in, for example, an entryway or exit of a building, airport, parking lot, elevator, or sporting event. Transition zone 204, as described in co-pending patent application "METHOD, APPARATUS, AND PROGRAM FOR AUTOMATED PROPERTY ADJUSTMENT IN A CELLULAR NETWORK, includes any suitable signal weakening mechanism that impedes, attenuates, or blocks the signal strength between mobile phone 212 and tower 216 to the extent that mobile phone 212 initiates a re-scan as described above. Such weakening mechanism could include external signal shielding 208, short-range signal jammer 202, or a combination of both. Alternatively, one skilled in the art will recognize that other conventional signal weakening mechanisms may be used without departing from the scope and spirit of the invention.

When activated wireless device 212 enters transition zone 204, shielding 208 and/or jammer 202 block or weaken the strength of signal 224. If the system uses a short-range signal jammer 202, it will jam all channels except those generated and received by transceiver 206. As the customer moves through transition zone 204, signal 224 weakens to the point that wireless device 212 initiates a re-scan to find a channel with a stronger signal. However, if the customer is having a conversation, signal 224 may be sufficient to maintain the conversation (or any disruption may go unnoticed by the user). Once wireless device 212 initiates a re-scan, it will lock onto a control channel having the strongest signal, which, in this case, will be a forward control path having a ghost SID transmitted by transceiver 206. Transceiver 206, positioned within transition zone 204, may a conventional transmit/receive device well known in the art. Wireless device 212 now believes that it is communicating with another base station (which it is not). After comparing transceiver 206's ghost SID with its own to determine if its roaming, wireless device 212 then transmits its identity information to transceiver 206 on the reverse control path, believing that it is registering with a base station. As described above, identity information may include the wireless device's telephone number, electronic serial number, and SID. Next, transceiver 206 forwards the identity information to vendor computer 222 (and, optionally, to MTSO 218) via communications network 220. In response, vendor computer 222 compares the telephone number and/or electronic serial number to its reservation database. If a match occurs, vendor computer 222 has verified identity, and now proceeds to retrieve and verify the reservation by comparing the arrival date in the reservation with the current date and, if a match occurs, vendor computer 222 assigns an object (e.g., room, car, seat, etc) to the customer according to the specifics in the reservation. Vendor computer 222 then forwards the assignment to wireless device 212 by dialing mobile device 212's telephone number. All this can occur within seconds. Once mobile device 212 exits transition zone 204, the channel between mobile device 212 and transceiver 204 will be blocked/attenuated by shielding 208 such that mobile device 212 will initiate another re-scan. Mobile device 212 should re-establish full communication with tower 216, whereupon it will be ready to display the assignment sent by vendor computer 222. Vendor computer 222 may send, for example, a text or audio message to wireless device 212 that includes a specific assignment of the object (e.g., Room 289) and, where appropriate, a key to the object, such as a code to a cipher lock. U.S. Pat. No. 6,581,161, assigned to IBM Corporation, describes a method for using a portable device as a key and is incorporated by reference herein.

As previously described, transceiver 206 communicates with vendor computer 222 via communications network 220. Alternatively, transceiver 206 may communicate by other means, such as through a dial-up connection. Moreover, transceiver 206 may communicate the identity information with a plurality of computers and MTSOs for different wireless communications companies, or it may send identity information to a central third-party service (not shown) for handling communication to the vendor.

Figure 3A:
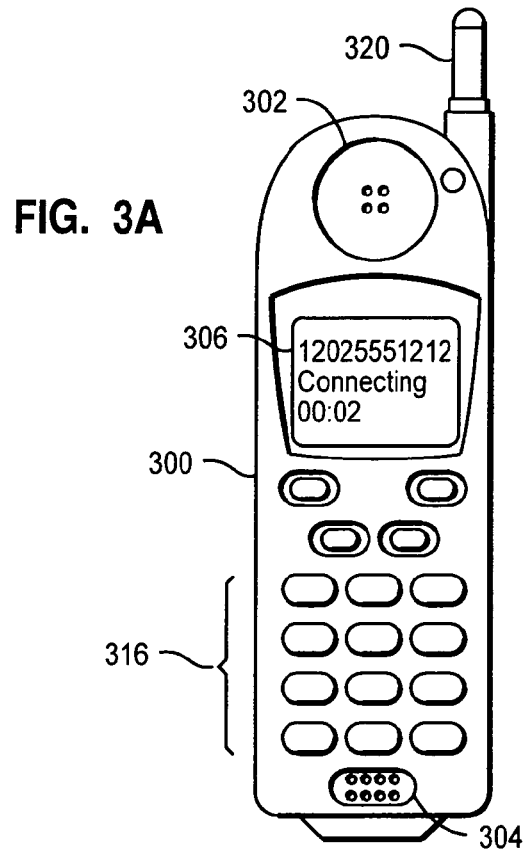
FIGS. 3A and 3B illustrate a wireless telephone device that may be used in a preferred embodiment of the present invention.
Figure 3B:
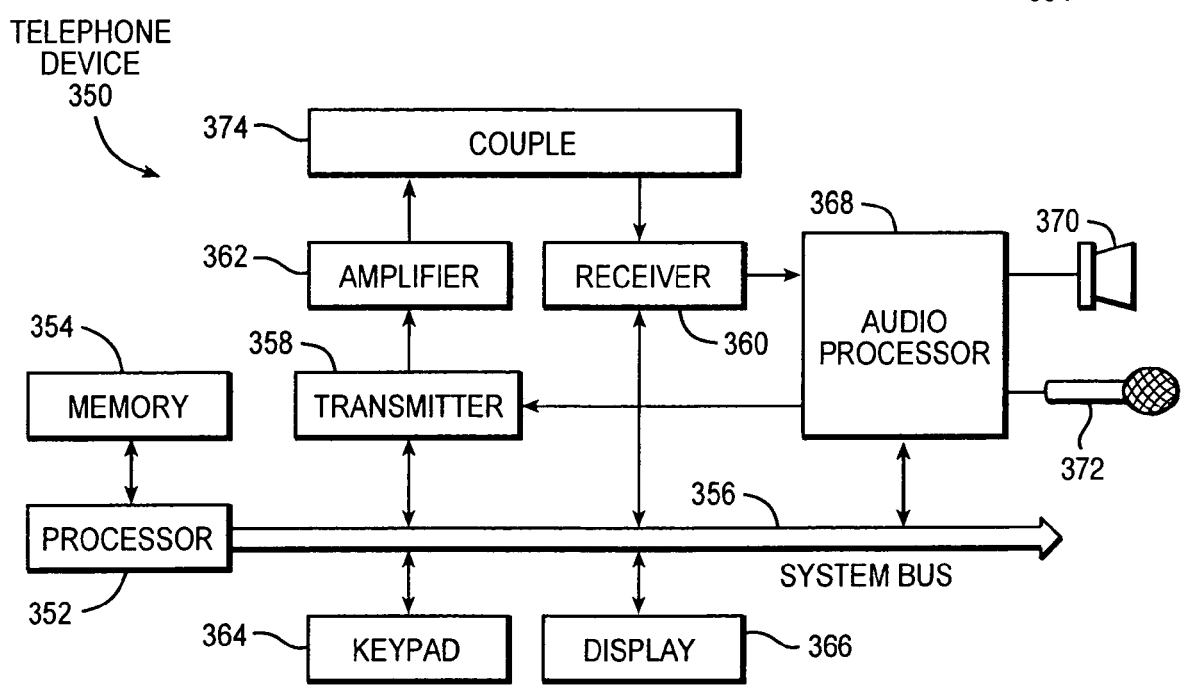

FIGS. 3A and 3B illustrate a wireless telephonic device that may be used in a preferred embodiment of the present invention. FIG. 3A shows wireless telephone device 300, which includes speaker 302, microphone 304, display 306, and keypad 316. Wireless telephone device 300 also includes antenna 320 for communication with the nearest base station. Wireless telephone 300 may include other features common to mobile telephones, such as function buttons, cursor control buttons, scroll wheels, and caller ID. Moreover, wireless telephonic devices may include any device that can be dialed by the cellular telecommunications network, such as a personal digital assistant (PDA). FIG. 3B depicts a block diagram of a hardware configuration of a wireless telephone device in accordance with a preferred embodiment of the present invention. Telephone device 350 includes processor 352 for controlling operation of the telephone device and memory 354. Processor 352 is a general-purpose microprocessor operating under the control of instructions stored in a memory, such as a memory 354. Processor 352 connects to transmitter 358, receiver 360, keypad 364, display 366, and audio processor 368 via system bus 356. Keypad 364 may be keypad 318 in FIG. 3A. Display 366 may be display 306 in FIG. 3A. Display 366 may be a liquid crystal display or other known display, such as an active matrix display. Transmitter 358 and receiver 360 couple to a telephone signal by coupler 374 to provide full duplex communication. An antenna provides the telephone signal, such as antenna 320 in FIG. 3A, in a wireless telephone. Audio processing circuit 368 provides basic analog audio outputs to speaker 370 and accepts analog audio inputs from microphone 372. Receiver 360 demodulates and decodes received signals. Transmitter 358 codes and modulates signals passed to it by processor 352 or audio processor 368. Power amplifier 362 amplifies the output of the transmitter to control the power level at which the signal is transmitted. Processor 352 is programmed to re-scan when a signal from a communications tower or base station is lost or weakened.

Figure 4:
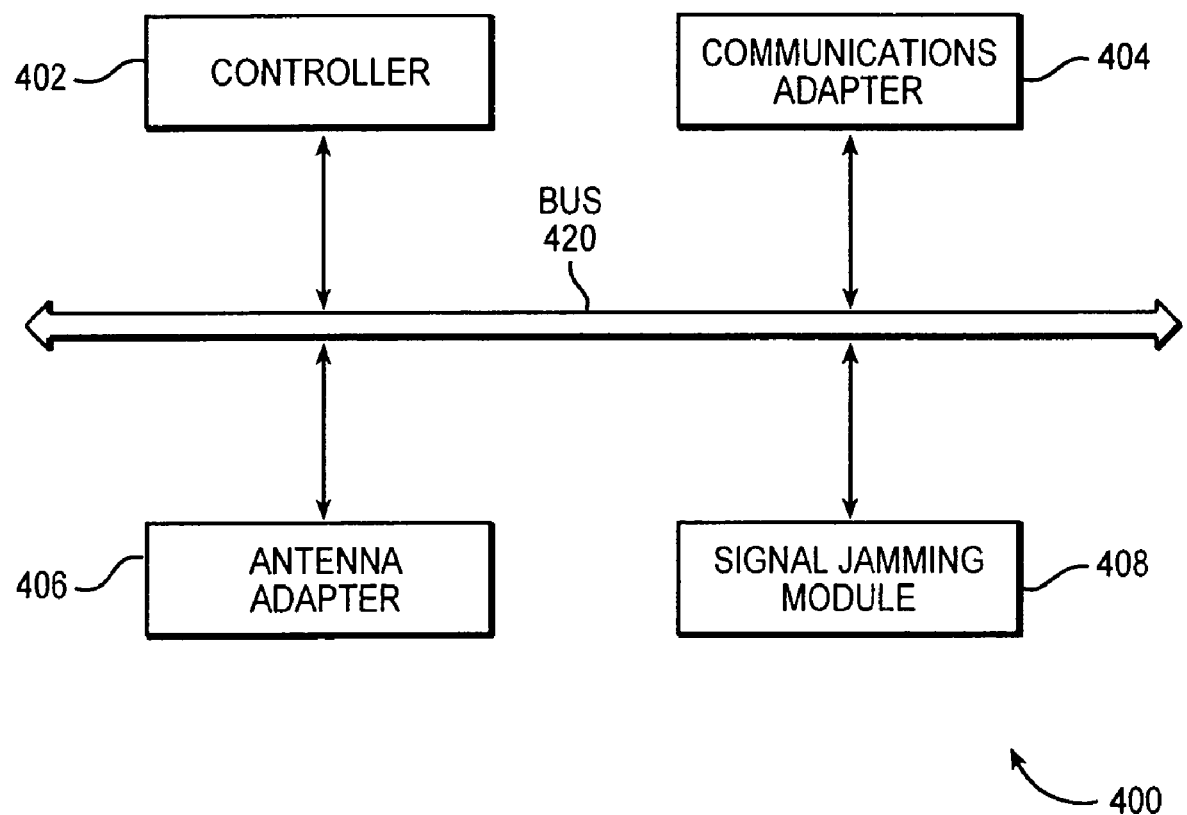
FIG. 4 is an exemplary block diagram of a signal jammer that may be used in a preferred embodiment of the present invention.

FIG. 4 is an exemplary block diagram of a conventional signal jammer 400, which includes controller 402, communications adapter 404, antenna adapter 406, and signal jamming module 408. Elements 402-408 may be implemented as hardware, software, or a combination of both. Elements 402-408 couple to one another via the control/data signal bus 420. Controller 402 controls the overall operation of the signal jammer and the operation of the other elements 404-408. Signal jamming module 408 instructs controller 402 to transmit a signal via antenna adapter 406 to disrupt or jam communications between wireless devices and their respective cellular communications towers and base stations except those channels transmitted and received by transceiver 206. Controller 402 may also operate under the control of another device by receiving instructions or messages through communications adapter 404, which may be, for example, a network adapter, a modem, a serial port, or the like.

Figure 5:
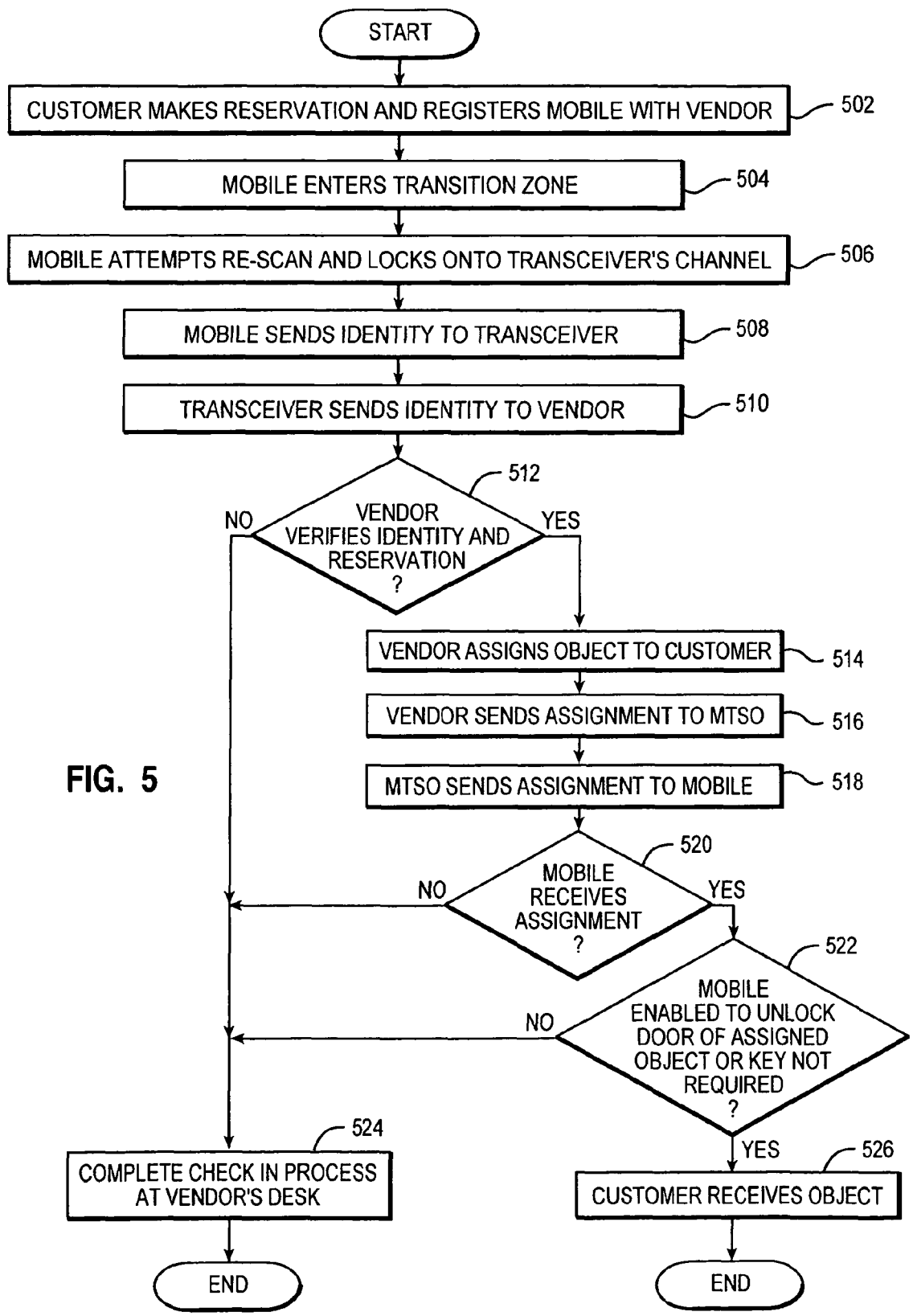
FIG. 5 is a flowchart illustrating the operation of an assignment system in accordance with a preferred embodiment of the present invention.

FIG. 5 is a flowchart of the operation of system 200. Referencing both FIGS. 2 and 5, processing starts at 502 where the customer makes a reservation and identifies his wireless device with a vendor. At 504, the customer and his wireless device enter transition zone 204. At 506, the wireless device attempts to re-scan for a new channel because of the attenuation from the shielding 208. The wireless device will lock onto the channel transmitted by transceiver 206. At 508, the wireless device sends its identity information to transceiver 206 (steps 506 and 508 are described in more detail in FIGS. 6 and 7). At 510, transceiver 206 sends the identity information (phone number, electronic serial number, and the carrier's SID) to vendor computer 222 via network 220. In response, at 512, vendor computer 222 attempts to verify the customer's identity and reservation by first comparing the received identity information (e.g., telephone number) with its reservation database. If a match occurs, vendor computer 222 has verified the identity and then retrieves the reservation information associated with the identity information. Computer 222 compares the arrival date in the reservation with the actual date and if a match occurs, the reservation has been verified. If neither identity nor reservation is verified, control moves to 524. If both are verified, at 514, vendor computer 222 assigns an object to the customer in accordance with the reservation and, at 516, conventionally sends the assignment to the appropriate MTSO 218 by dialing the mobile's phone number. In turn, at 518, the MTSO 218 sends the assignment to the wireless device per conventional means. Once the customer exists transition zone 204, the wireless device should reestablish communication with tower 216 and receive the assignment at 520. If not, at 524, the customer completes the check-in process at the vendor's desk. If so, at 522, if the wireless device is enabled to function as a key or if a key is not required to open the object, then the process ends at 526 with the customer receiving the object. If the mobile device is not enabled to function as a key and a key is required for the object, then control moves to 524, where the customer must visit the vendor's desk.

Figure 6:
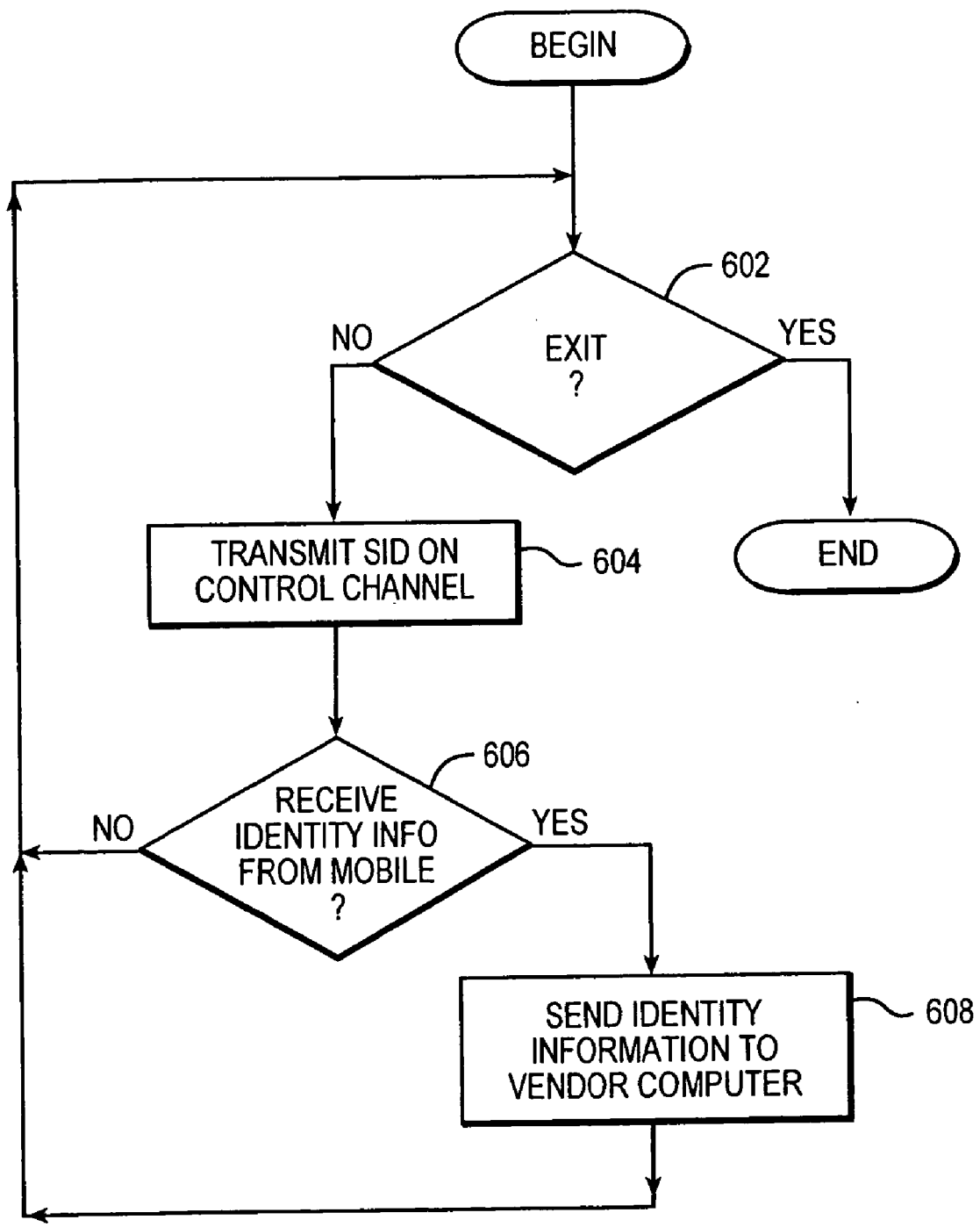
FIG. 6 is a flowchart of the operation of a transceiver in accordance with a preferred embodiment of the present invention.

FIG. 6 is a flowchart of the operation of transceiver 206 in accordance with a preferred embodiment of the present invention. The process begins at 602 where a determination is made as to whether an exit condition exists. An exit condition may exist, for example, if transceiver 206 is powered down. If an exit condition exists, the process ends. If an exit condition does not exist, at 604, transceiver 206 transmits a ghost SID on its forward control path and, at 606, monitors its reverse control path for identity information. If no information is received, control returns to 602. If transceiver 206 receives identity information from a wireless device, at 608, it sends the identity information to vendor computer 222 and control returns to 602.

Figure 7:
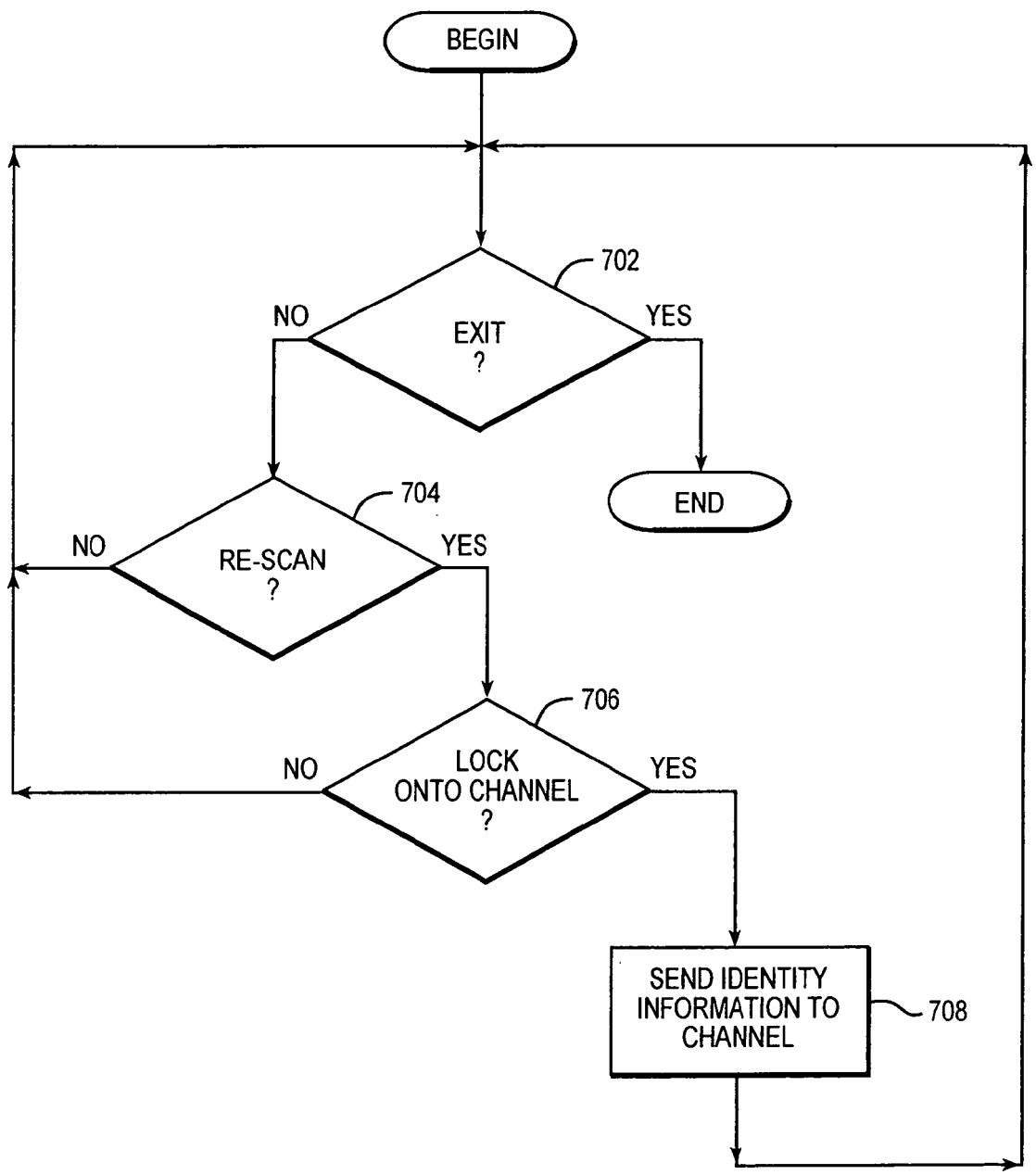
FIG. 7 is a flowchart of the operation of a wireless device in accordance with a preferred embodiment of the present invention.

FIG. 7 a flowchart of the operation of wireless device 212 in accordance with a preferred embodiment of the present invention. At 702, wireless device 212 determines if there is an exist condition, such as powering down the phone. If an exit condition exists, the process ends. If an exit condition does not exist, at 704, wireless device 212 determines if it needs to re-scan for another channel either because it does automatically on a periodic basis or because the existing signal strength has weakened. If not, controls returns to 702. If yes, at 706, wireless device 212 scans the available forward control paths to determine if it can lock onto a stronger channel. If not, control returns to 702. If wireless device 212 can lock onto a stronger channel, it sends its identity information on the forward control path of that channel in an attempt to register itself with a local base station. Control returns to 702.

FIG. 8 is a block diagram depicting a computer system 222 in which the present method and system may be implemented. A central processing unit (CPU) 10 connects to various other components by system bus 12. An operating system 41 runs on CPU 10, provides control and coordinates the functions of the various components. Operating system 41 may be one of the commercially available operating systems, such as Microsoft's Windows, as well as UNIX, AIX, or LINUX operating systems. Application programs 40, controlled by the system, are moved into and out of the main memory, RAM 14. These programs include programs of the preferred embodiment for transmitting information to and from both customer computers (not shown) and transceiver 206, database applications for storing and verifying customer reservation information and wireless device identification, as well as programs for assigning objects to various customers upon successful verification.

A read only memory (ROM) 16 connects to CPU 10 via bus 12 and includes the basic input/output system (BIOS) that controls the basic computer functions. RAM 14, I/O adapter 18, and communications adapter 34 are also interconnected to system bus 12. I/O adapter 18 communicates with the disk storage device 20, which may be used to store database information (e.g., database storage). Communications adapter 34 interconnects bus 12 with an outside network enabling the data processing system to communicate as respectively described above through the Web, Internet, or intranet. I/O devices also connect to system bus 12 via user interface adapter 22 and display adapter 36. Keyboard 24 and mouse 26 connect to bus 12 through user interface adapter 22. It is through such input devices that the vendor may interactively receive or control E-Mail messages or other information. Display adapter 36 includes a frame buffer 39, which is a storage device that holds a representation of each pixel on monitor 38. Images may be stored in frame buffer 39 for display on monitor 38 through various components, such as a digital to analog converter (not shown) and the like. By using the aforementioned I/O devices, the vendor is capable of inputting information to the system through keyboard 24 or mouse 26 and receiving output information from the system via display 38.

While the invention has been particularly shown and described with reference to a preferred embodiment, it will be understood by those skilled in the art that various changes in form and detail may be made herein without departing from the spirit and scope of the invention.

We claim:

1. In a cellular telecommunications network, a system for transmitting an assignment to a wireless device, comprising:
    a computer for receiving a first identification of a first wireless device and a reservation associated with the first wireless device;
    a transition zone for creating an out of range condition on a second wireless device;
    in response to creating the out of range condition, the computer for receiving a second identification of the second wireless device from the second wireless device;
    the computer for comparing the first identification to the second identification and in response to a match, verifying the reservation; and
    the computer for transmitting an assignment to the first wireless device in response to verifying the reservation.

2. The system of claim 1, wherein the computer stores the reservation and the first identification of the first wireless device.

3. The system of claim 1, wherein the first and second identifications are telephone numbers.

4. The system of claim 1, wherein the transition zone comprises:
    shielding and/or a signal jammer; and
    in response to the second wireless device entering the transition zone, the shielding and/or signal jammer causes the second wireless device to rescan for a channel.

5. The system of claim 4, wherein the transition zone further comprises:
    a transceiver for transmitting a channel in the transition zone;

the transceiver for receiving the second identification of the second wireless device on the channel; and the transceiver for transmitting the second identification to the computer.

6. The system of claim 1, wherein the computer further comprises:

the computer for comparing the first identification to the second identification and in response to a match, retrieving the reservation associated with the first wireless device;

the computer for comparing an arrival date in the reservation with a current date and in response to a match, verifying the reservation; and in response to verifying the reservation, the computer for assigning an object to the first wireless device in accordance with the reservation, thereby making the assignment.

7. The system of claim 6, wherein the computer further comprises: the computer calling the first wireless device and leaving a text message of the assignment of the object or an audio message of the assignment of the object.

8. The system of claim 1, further comprising:

the computer transmitting lock information to the first wireless device to enable the wireless device to function as a key.

9. The system of claim 8, wherein the lock information is a code to a cipher lock.

* * * * *